(12) United States Patent
Schwesig et al.

(10) Patent No.: US 11,075,969 B2
(45) Date of Patent: Jul. 27, 2021

(54) UTILIZING PUBLISHING AND SUBSCRIBING CLIENTS IN NETWORK MEDIA CHANNELS

(71) Applicant: DRNC Holdings, Inc., Wilmington, DE (US)

(72) Inventors: Carsten Schwesig, Tokyo (JP); Eduardo Sciammarella, Chicago, IL (US); John Poisson, Hooksett, NH (US); Ryoichi Imaizumi, Tokyo (JP); Norikazu Hiraki, Kanagawa (JP)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

(21) Appl. No.: 14/106,332

(22) Filed: Dec. 13, 2013

(65) Prior Publication Data
US 2014/0108510 A1    Apr. 17, 2014

Related U.S. Application Data

(60) Continuation of application No. 12/575,420, filed on Oct. 7, 2009, now Pat. No. 8,645,322, which is a
(Continued)

(51) Int. Cl.
*H04L 29/06* (2006.01)
*H04N 21/414* (2011.01)
(Continued)

(52) U.S. Cl.
CPC .......... *H04L 65/60* (2013.01); *G11B 27/031* (2013.01); *H04L 65/605* (2013.01);
(Continued)

(58) Field of Classification Search
CPC .......... G06F 17/30017; G06F 16/2468; G06F 16/137; G06F 16/174
(Continued)

(56) References Cited

U.S. PATENT DOCUMENTS

| 5,534,911 A | 7/1996 | Levitan et al. |
| 5,801,919 A | 9/1998 | Griencewic et al. |

(Continued)

FOREIGN PATENT DOCUMENTS

| EP | 0700205 | 3/1996 |
| WO | WO 97 13368 | 4/1997 |

(Continued)

OTHER PUBLICATIONS

Pilgrim, Mark, "What is RSS?", Retrieved http://www.xml.com/pub/a/2002/12/18/dive-into-xml.html, Dec. 18, 2002.
(Continued)

*Primary Examiner* — James Trujillo
*Assistant Examiner* — Kurt A Mueller
(74) *Attorney, Agent, or Firm* — Condo Roccia Koptiw LLP

(57) ABSTRACT

Utilizing publishing and subscribing clients in network media channels having a first network coupled to at least a first server and a second server. The first server includes storage configured to store media data, and a network media channel manager configured to send and receive the media data according to one or more network media channels. The first server is also coupled to a publishing client, which is configured to publish the media data using a first network media channel selected from the one or more network media channels, and a subscribing client in a local network external to a first network. The subscribing client subscribes and accesses the media data using a second network media channel selected from the one or more network media channels. One or more network media channels include at least one local channel that is limited to the local network so that only the subscribing client can present to the local channel.

27 Claims, 11 Drawing Sheets

Related U.S. Application Data division of application No. 11/626,167, filed on Jan. 23, 2007, now Pat. No. 8,010,486, which is a continuation of application No. 10/613,349, filed on Jul. 3, 2003, now Pat. No. 7,177,881.

(60) Provisional application No. 60/480,682, filed on Jun. 23, 2003.

(51) Int. Cl.

| | | |
|---|---|---|
| *H04N 21/24* | (2011.01) | |
| *H04N 21/4223* | (2011.01) | |
| *G11B 27/031* | (2006.01) | |
| *H04N 21/44* | (2011.01) | |
| *H04N 21/437* | (2011.01) | |
| *H04N 21/61* | (2011.01) | |
| *H04N 21/4363* | (2011.01) | |
| *H04N 21/2743* | (2011.01) | |
| *H04N 21/4788* | (2011.01) | |
| *H04L 29/08* | (2006.01) | |

(52) U.S. Cl.
CPC ............ *H04L 67/104* (2013.01); *H04L 67/30* (2013.01); *H04L 67/42* (2013.01); *H04N 21/2408* (2013.01); *H04N 21/2743* (2013.01); *H04N 21/41407* (2013.01); *H04N 21/4223* (2013.01); *H04N 21/437* (2013.01); *H04N 21/43637* (2013.01); *H04N 21/44* (2013.01); *H04N 21/4788* (2013.01); *H04N 21/6131* (2013.01); *H04N 21/6181* (2013.01); *Y10S 707/99945* (2013.01); *Y10S 707/99948* (2013.01)

(58) Field of Classification Search
USPC ........................................................ 707/622
See application file for complete search history.

(56) References Cited

U.S. PATENT DOCUMENTS

| | | | |
|---|---|---|---|
| 6,005,560 A | | 12/1999 | Gill et al. |
| 6,041,345 A | * | 3/2000 | Levi ........................ H04L 29/06 |
| | | | 375/E7.267 |
| 6,477,707 B1 | | 11/2002 | King et al. |
| 6,567,122 B1 | | 5/2003 | Anderson et al. |
| 6,721,741 B1 | | 4/2004 | Eyal et al. |
| 6,774,926 B1 | | 8/2004 | Ellis et al. |
| 6,993,532 B1 | | 1/2006 | Platt et al. |
| 7,532,234 B2 | | 5/2009 | Sadovsky et al. |
| 2002/0026462 A1 | | 2/2002 | Shotton et al. |
| 2002/0174430 A1 | | 2/2002 | Ellis et al. |
| 2002/0055920 A1 | * | 5/2002 | Fanning ............ G06F 17/30722 |
| 2002/0056119 A1 | | 5/2002 | Moynihan et al. |
| 2002/0104099 A1 | | 8/2002 | Novak et al. |
| 2002/0190876 A1 | | 12/2002 | Lai et al. |
| 2003/0030731 A1 | | 2/2003 | Colby et al. |
| 2003/0046240 A1 | | 3/2003 | Stone et al. |
| 2003/0061369 A1 | | 3/2003 | Aksu et al. |
| 2003/0063770 A1 | | 4/2003 | Svendsen et al. |
| 2003/0140090 A1 | | 7/2003 | Rezvani et al. |
| 2003/0184793 A1 | | 10/2003 | Pineau et al. |
| 2003/0195929 A1 | | 10/2003 | Franke et al. |
| 2003/0233241 A1 | | 12/2003 | Marsh et al. |
| 2004/0003090 A1 | * | 1/2004 | Deeds ........................... 709/227 |
| 2004/0019645 A1 | | 1/2004 | Goodman et al. |
| 2004/0044732 A1 | * | 3/2004 | Fushiki .................. G06T 11/60 |
| | | | 709/205 |
| 2004/0070678 A1 | * | 4/2004 | Toyama et al. ............ 348/231.3 |
| 2004/0071099 A1 | | 4/2004 | Costa-Requena et al. |
| 2004/0133914 A1 | | 7/2004 | Smith et al. |
| 2004/0260669 A1 | | 12/2004 | Fernandez et al. |
| 2006/0064716 A1 | | 3/2006 | Sull et al. |
| 2007/0078768 A1 | | 4/2007 | Dawson et al. |

FOREIGN PATENT DOCUMENTS

| | | |
|---|---|---|
| WO | WO 99-12349 | 3/1999 |
| WO | WO 01-19084 | 3/2001 |

OTHER PUBLICATIONS

"RDF Site Summary (RSS) 1.0", Dec. 6, 2000, 1 page.
"RSS Notification", Retrieved from http://www. gallatin. com/wcm/publishing.nsf/content.GTirss Dec. 18, 2002, 2 pages.
The Furrygoat Experience, "PocketFeed", Available at http://www.furrygoat.com/Misc/Software. html Dec. 28, 2003, 6 pages.

\* cited by examiner

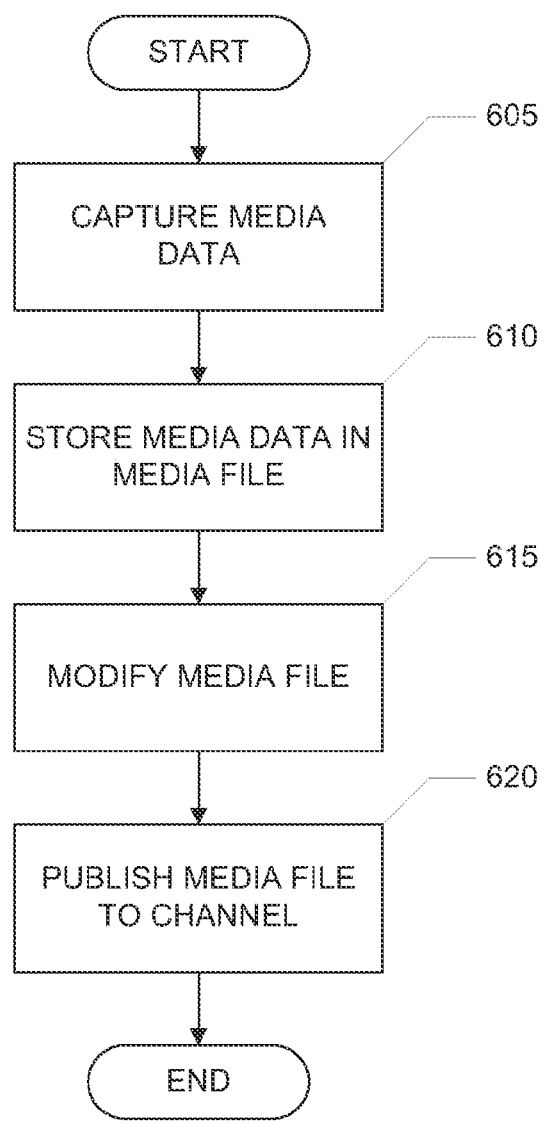

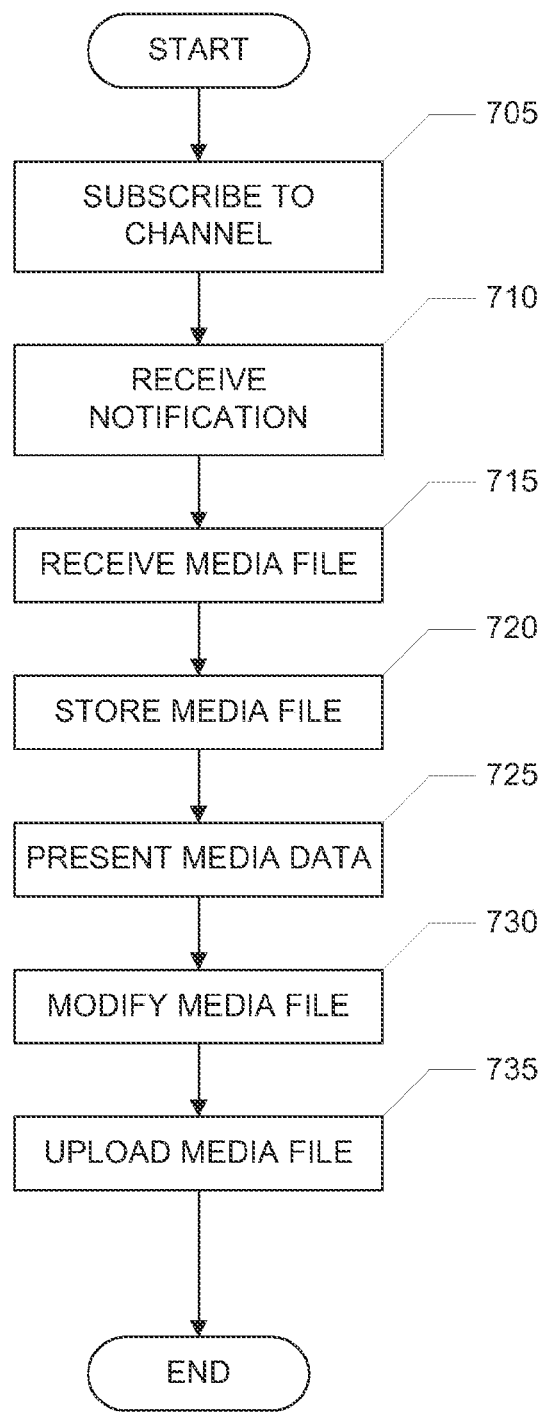

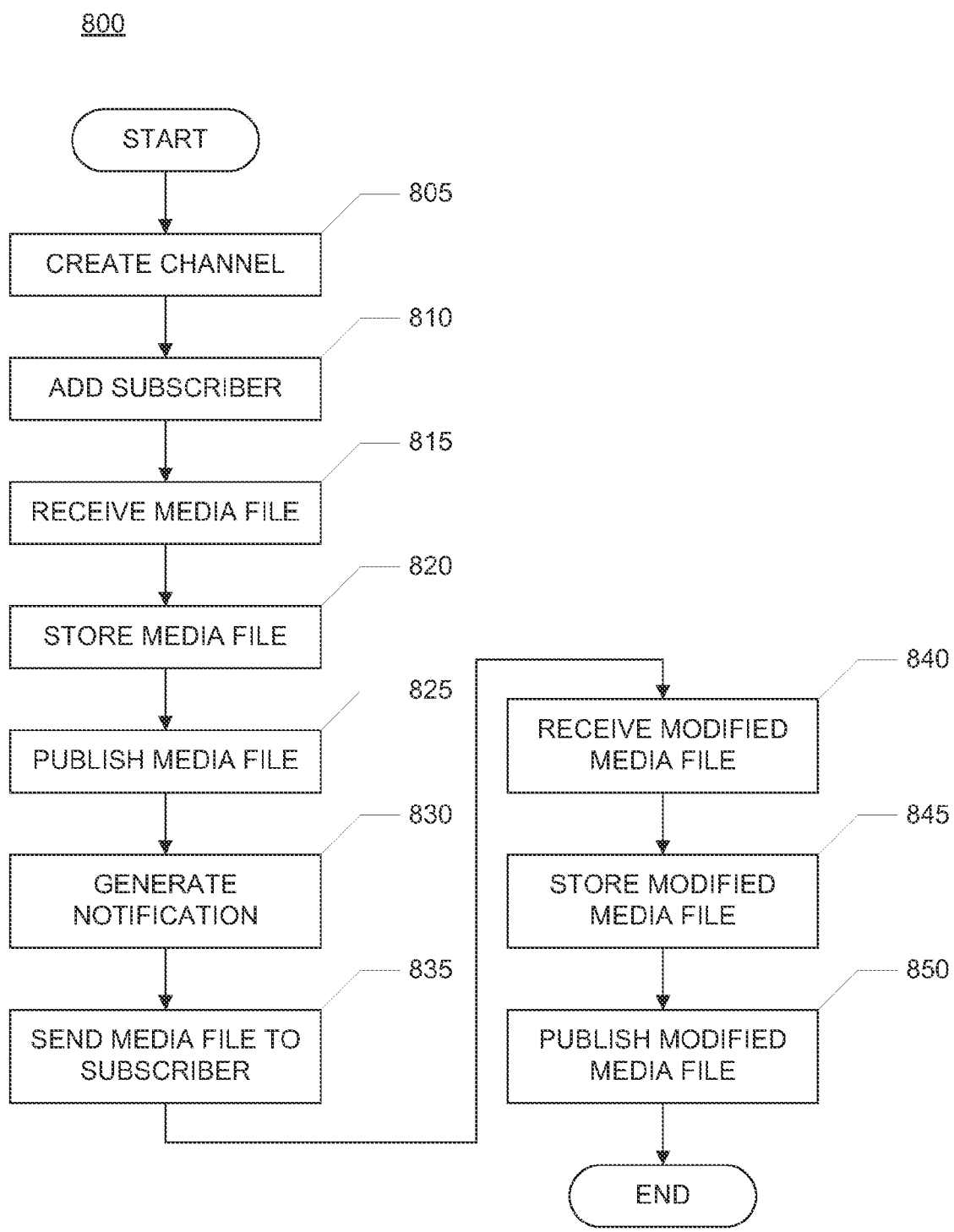

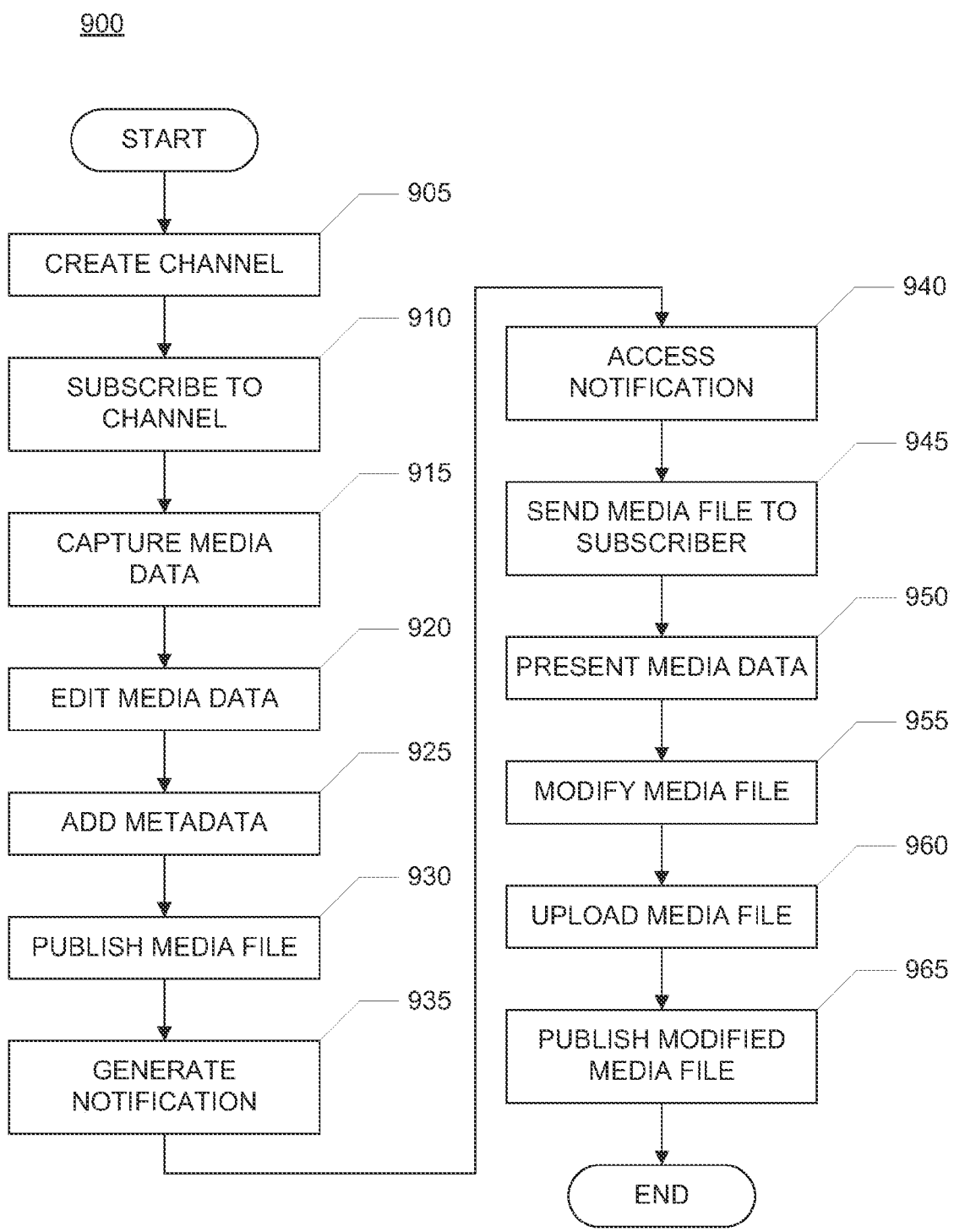

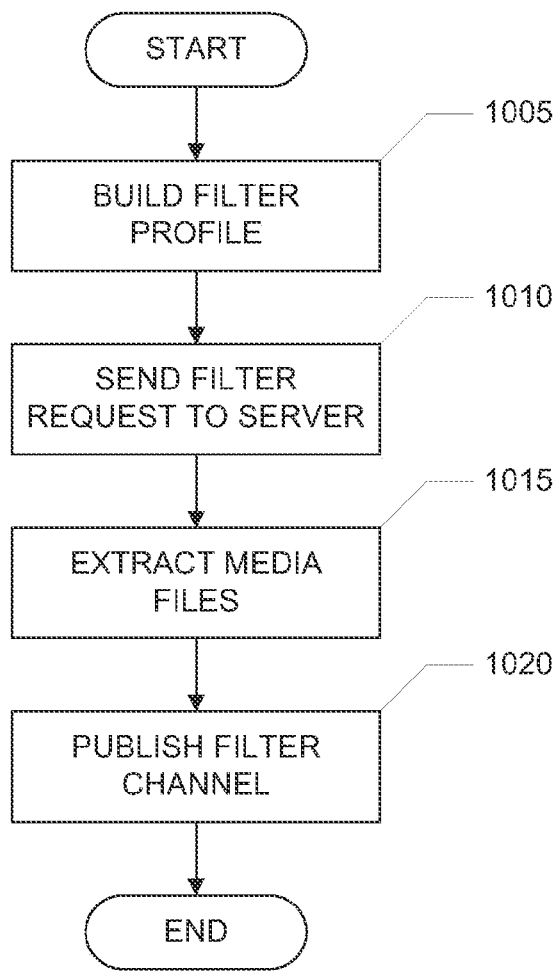

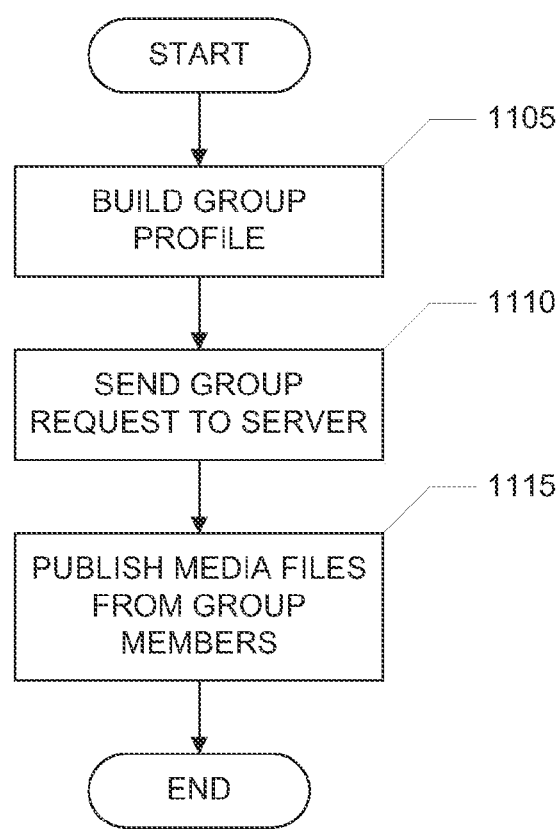

UTILIZING PUBLISHING AND SUBSCRIBING CLIENTS IN NETWORK MEDIA CHANNELS

CROSS-REFERENCE TO RELATED APPLICATIONS

This application is a continuation of U.S. patent application Ser. No. 12/575,420, filed Oct. 7, 2009, which is a divisional application of U.S. patent application Ser. No. 11/626,167, filed Jan. 23, 2007 (now U.S. Pat. No. 8,010,486, issued Aug. 30, 2011), which is a continuation application of U.S. patent application Ser. No. 10/613,349, filed Jul. 3, 2003 (now U.S. Pat. No. 7,177,881, issued Feb. 13, 2007), which claims the benefit of U.S. Provisional Patent Application No. 60/480,682, filed Jun. 23, 2003. The disclosures of the above-cited applications are incorporated herein by reference in their entirety.

BACKGROUND

Sharing pictures and video among people is often a popular form of entertainment. With the growing popularity of the Internet, sending images across the Internet has also become more popular.

Recently, mobile devices such as cellular phones and PDA's (Personal Digital Assistants) include media capture devices such as cameras and microphones. In addition, some devices have data network capability. Accordingly, it is desirable to provide users of these mobile devices with a convenient and enjoyable environment for sharing images and audio across networks.

SUMMARY

The present invention provides methods and apparatus for providing network media channels. In one implementation, a method of providing a network media channel includes: capturing media data using a media capture device, wherein said media capture device is connected to a network and includes local storage and a media editing component; storing said captured media data in a media file in said local storage of said media capture device; modifying said media file using said media editing component of said media capture device; and publishing said modified media file to said network to correspond to a network media channel, such that said published media file is accessible through said network.

In another implementation, a method of providing a network media channel includes: subscribing to a network media channel with a server through a network; receiving a notification of an update to said network media channel from said server through said network; and receiving a media file corresponding to said update of said network media channel at a media browsing device from said server through said network.

In another implementation, a method of providing a network media channel includes: receiving a media file corresponding to a network media channel through a network from a publishing client; storing said media file according to said network media channel; creating a notification indicating said media file has been received; and sending said media file to a subscriber client through said network.

In another implementation, a system for providing a network media channel includes: a network; a server connected to said network, wherein said server includes storage for storing media files, and a network media channel manager for receiving and sending media files according to one or more media network channels; a publishing client connected to said network, wherein said publishing client includes a media capture component for capturing media data and storing captured media data in a media file, a media editing component for editing media files, and a publishing component for publishing to said server a media file corresponding to a network media channel; and a subscribing client connected to said network, wherein said subscribing client includes a subscribing component for subscribing to one or more network media channels, and a browsing component for accessing media files received according to subscribed network media channels.

BRIEF DESCRIPTION OF THE DRAWINGS

FIG. 6 shows a flowchart of one implementation of providing a network media channel using a publishing client and a server interconnected by a network.

FIG. 7 shows a flowchart of one implementation of providing a network media channel using a subscribing client and a server interconnected by a network.

FIG. 8 shows a flowchart of one implementation of providing a network media channel using a server, a publishing client, and a subscribing client interconnected by a network.

FIG. 9 shows a flowchart of one implementation of providing a network media channel using a publishing client, a server, and a subscribing client interconnected by a network.

FIG. 10 shows a flowchart of one implementation of providing a filter channel using a server and a subscribing client interconnected by a network.

FIG. 11 shows a flowchart of one implementation of providing a group channel using a publishing client, a server, and a subscribing client interconnected by a network.

DETAILED DESCRIPTION

The present invention provides methods and apparatus for providing network media channels. In one implementation, a network media channel includes one or more media files, published to a server from one or more publishing clients. A publishing client captures media data into a media file, and edits and publishes the media file to a network media channel using a server. A subscribing client subscribes to one or more network media channels through the server and downloads media files in the subscribed network media channels.

Figure 1:
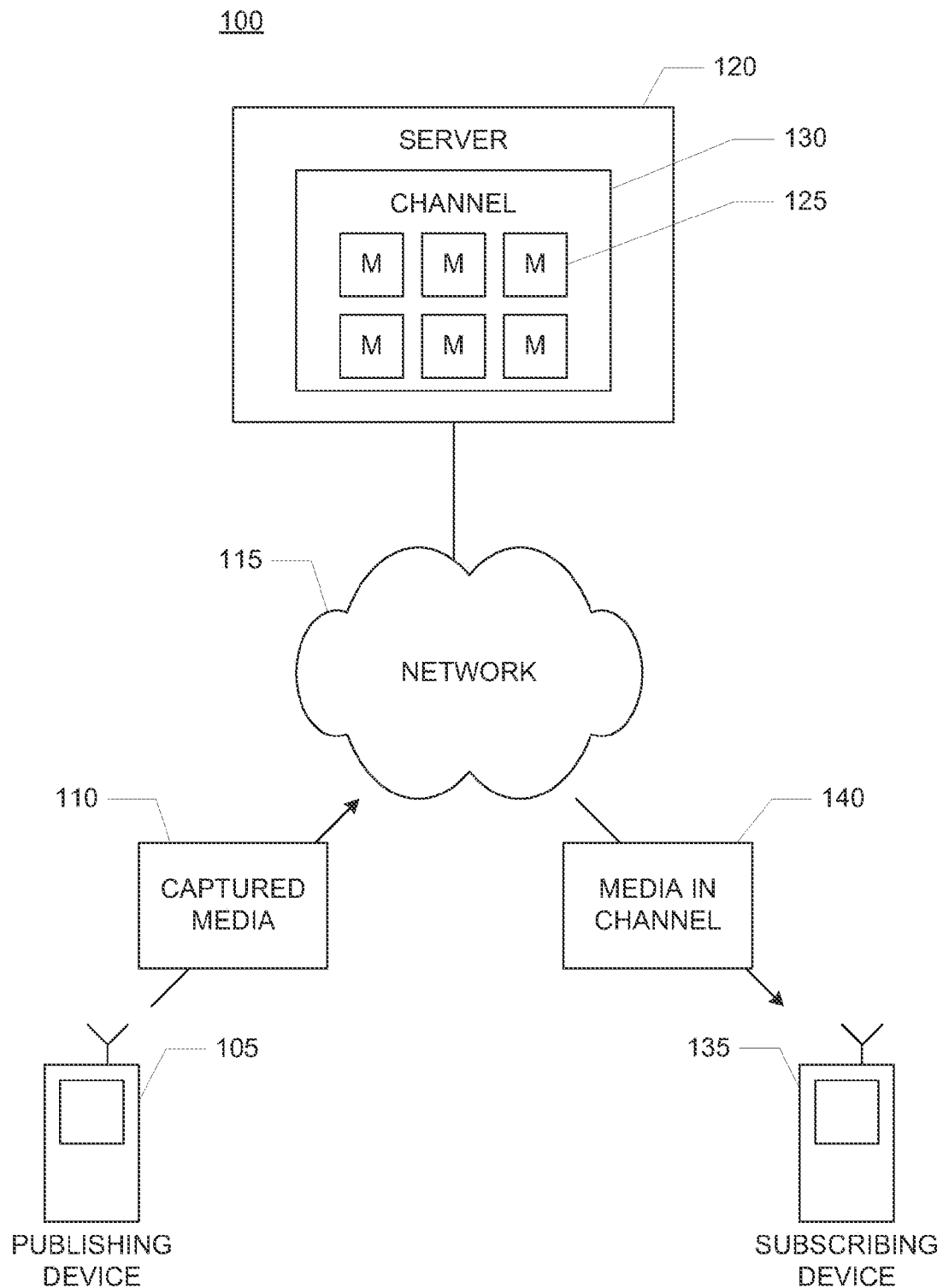
FIG. 1 shows a diagram of one implementation of providing network media channels.

In one example, in one implementation 100 of an environment providing network media channels shown in FIG. 1, a camera mobile phone 105 (e.g., a cellular phone including a digital camera capable of recording still and moving images) is a publishing client. A user, X, of the phone 105 captures several seconds of audio and video data of an interesting event at a party, storing the media data into a multimedia file in the phone 105. X uses an editing tool of the phone 105 to adjust the brightness of the video data and add a text title of "Friday Night" to the media file. X's phone 105 adds metadata to the media file indicating the time when the media file was created and updated, as well as the location of the phone 105 when the media file was created using an embedded GPS system. X's phone 105 also adds metadata to the media file indicating the media file is for a network media channel X had previously created, called "X's Life." X enters a publish command to publish the Friday Night media file to the X's Life network media channel.

X's phone 105 sends the Friday Night media file 110 to a server 120 through a network 115 (e.g., the Internet). The server 120 receives the media file and evaluates the metadata of the media file to determine to which network media channel the media file belongs and stores the media file accordingly, in this case, storing the Friday Night media file 125 corresponding to the network media channel 130 for X's Life. The server 120 updates a notification page (e.g., an RSS page) for the X's Life network media channel, indicating that a new media file has been received for the X's Life channel.

Another mobile phone 135 (e.g., a cellular phone including a video display) used by a user Y is a subscribing client. Y has previously subscribed to the X's Life channel. Y has programmed his phone 135 to periodically check the notification page for his subscribed channels, including the X's Life channel. Y's phone 135 accesses the notification page for the X's Life channel through a request to the server 120. Y's phone 135 receives the notification page and recognizes that a new media file has been added to the X's Life channel. Y has also programmed his phone 135 to automatically download new media files found on notification pages for his subscribed channels, so the phone 135 begins downloading the new Friday Night media file 140. After Y's phone 135 has completed downloading the new Friday Night media file, the phone 135 notifies Y that new media is available for one of Y's subscribed channels. Y accesses the network media channel browsing function of his phone 135 and the phone 135 presents media files from three of Y's subscribed channels, including the X's Life channel. Y selects the Friday Night media file from the X's Life channel and enjoys the audio and video presented by Y's phone 135 from the file.

In this way, X captured, edited, and published media data from his phone, and Y received X's published media as a subscriber to X's network media channel. By receiving a series of media files for X's Life channel, Y can experience a time-based progression of media information presented by the channel's publisher, X, similar to a journal or log. In addition, both or either of X's phone 105 and Y's phone 135 can be both a subscribing client and a publishing client. In that case, X and Y can both publish network media channels and subscribe to network media channels, such as to each other's channel.

Figure 2:
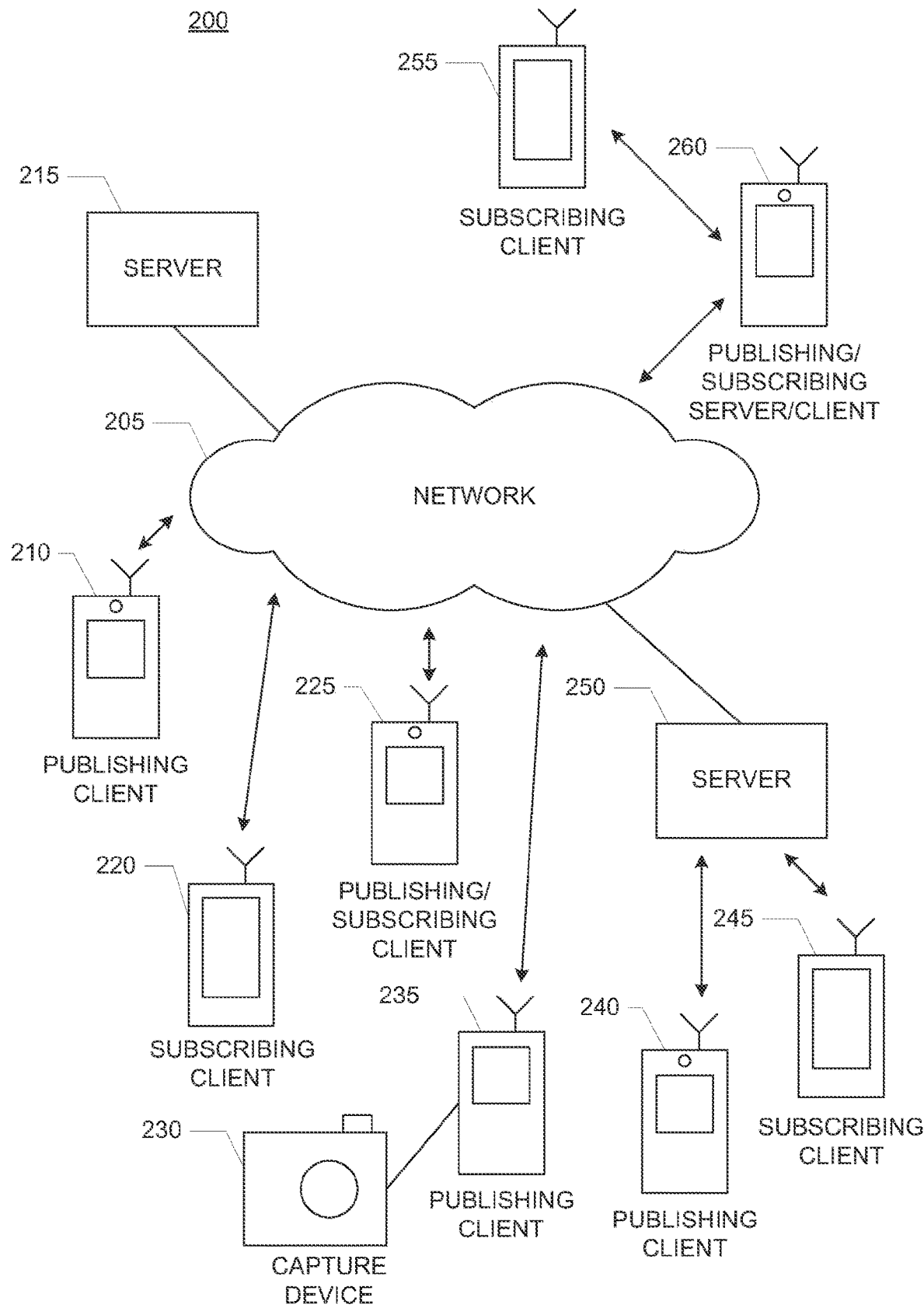
FIG. 2 shows a network environment supporting various arrangements of clients and servers providing network media channels.

FIG. 2 shows a network environment 200 supporting various arrangements of clients and servers providing network media channels. At the center of the environment 200 is a network 205. In one implementation, the network 205 is a combination of an IP (Internet Protocol) network, such as the Internet, and one or more wireless networks, such as a cellular GSM (Global System for Mobile communications) network and an IEEE 802.11 (or "Wi-Fi") network. In other implementations, the network can be a single network or include other networks as well, such as LAN's, WAN's, and campus or enterprise intranets.

Various combinations of clients and servers are shown in the network environment 200. However, in other implementations, fewer, more, or different varieties of clients and servers can be present as well.

A publishing client 210 is connected to the network 205. The publishing client 210 is connected by a wireless connection, such as a wireless telephone connection or a wireless data connection. Any of the devices, clients or servers, in the network environment 200 can be connected to the network, or to another device as appropriate, by a wired or wireless connection in different implementations. The publishing client 210 includes a media capture component for capturing media data, such as one including a digital camera and a microphone. The publishing client 210 captures, edits, and publishes media data to one or more network media channels managed by a server on the network 205, such as server 215.

The server 215 is connected to the network and receives media files to add to network media channels and various requests in the course of providing the channels. A server provides or manages one or more network media channels. As described below, to provide a network media channel, a server receives and stores media files, organizes the files according to channels and other criteria, provides notifications of updates, and sends the media files for a channel to subscribers of that channel. Each server can use the same or a different combination of push (e.g., sending data before receiving a request) and pull (e.g., sending data in response to a request) techniques in providing data to the clients.

A subscribing client 220 is connected to the network 205 and subscribes to one or more network media channels provided by a server on the network 205, such as server 215. The subscribing client 220 receives media corresponding to the subscribed channel(s) from the server and presents the received media to a user.

A publishing/subscribing client 225 is connected to the network 205. The publishing/subscribing client 225 combines the functions of the publishing client 210 and the subscribing client 220. Accordingly, the publishing/subscribing client 225 captures, edits, and publishes media to one or more network media channels, and also subscribes to one or more network media channels to receive and present media from the subscribed channels.

A capture device 230 is connected to a publishing client 235. The publishing client 235 is in turn connected to the network 205. In this case, the functionality of the publishing client 210 described above is divided between the capture device 230 and the publishing client 235. The capture device 230 captures media data and passes the captured media data to the connected publishing client 235. The publishing client 235 edits and publishes the received media data to a server, such as server 215. In another implementation, the capture device 230 and publishing client 235 are linked together in a personal network using a short range wireless interface. In this case, the publishing client 235 can be further subdivided into component pieces in the personal network.

A publishing client 240 and a subscribing client 245 are connected to a server 250 in a local network external to the network 205. The server 250 can provide one or more local network media channels that are limited to the local network so that only the subscribing client 245 can present the local channel. However, the server 250 is also connected to the network 205 so the publishing client 240 can publish to the local server 250 or to another server on the network 205, such as server 215. Similarly, the subscribing client 245 can subscribe to local channels provided by the local server 250 and to channels provided by a server on the network 205, such as server 215. In addition, a publishing client outside the local network, such as publishing client 210 can publish to the local server 250, and a subscribing client outside the local network, such as subscribing client 220, can subscribe to a channel provided by the local server 250.

A subscribing client 255 is connected to a publishing/subscribing server/client 260. The publishing/subscribing server/client 260 is also connected to the network 205. The publishing/subscribing server/client 260 combines the functionality of the publishing client 210, the subscribing client 220, and the server 215. Accordingly, the publishing/subscribing server/client 260 captures, edits, and publishes media data to one or more network media channels. The publishing/subscribing server/client 260 can publish media to a channel provided by a server on the network, such as server 215 or server 250. However, the publishing/subscribing server/client 260 can also publish a channel to itself because the publishing/subscribing server/client 260 is also a server. The publishing/subscribing server/client 260 subscribes to one or more network media channels to receive and present media for subscribed channels. The publishing/subscribing server/client 260 can subscribe to a channel provided by a server on the network 205, such as server 215 or server 250. However, the publishing/subscribing server/client 260 can also subscribe to a channel provided by itself, because the publishing/subscribing server/client 260 is both a client and a server. In addition, the publishing/subscribing server/client 260 can provide network media channels for media published from other publishing clients on the network, such as publishing client 210, published by itself, or published by a directly connected publishing client (not shown).

Figure 3:
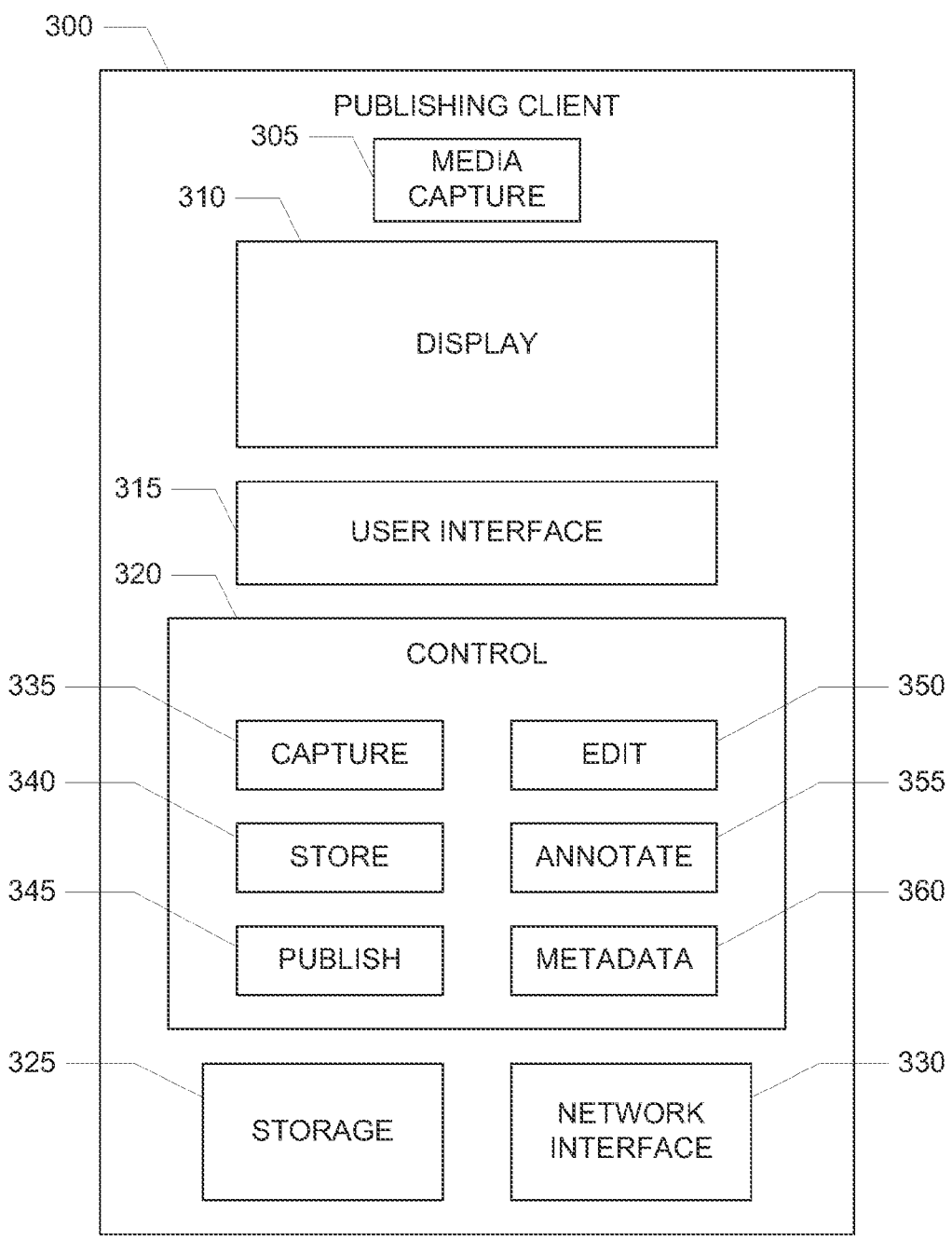
FIG. 3 shows a block diagram of one implementation of a publishing client.
Figure 4:
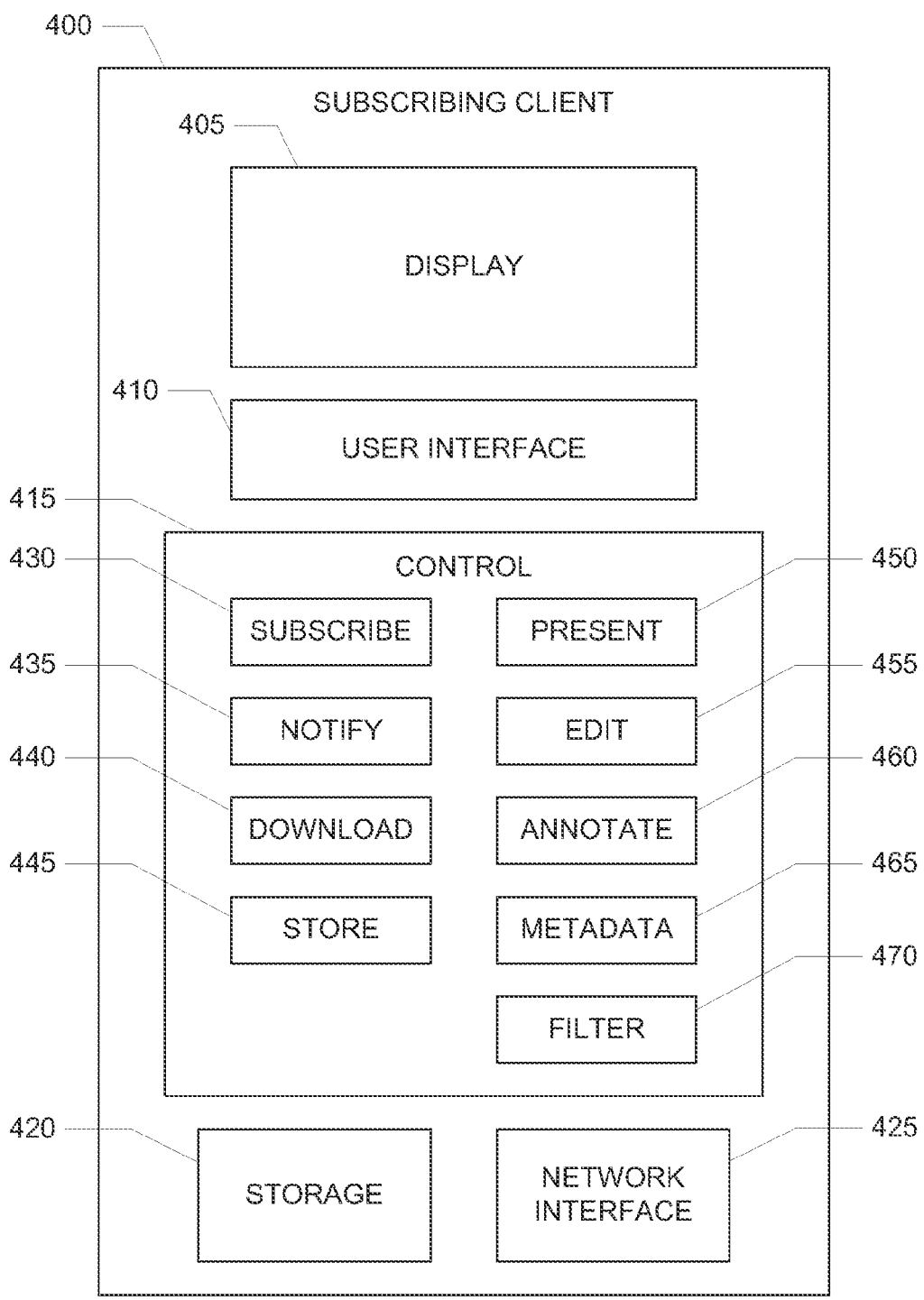
FIG. 4 shows a block diagram of one implementation of a subscribing client.
Figure 5:
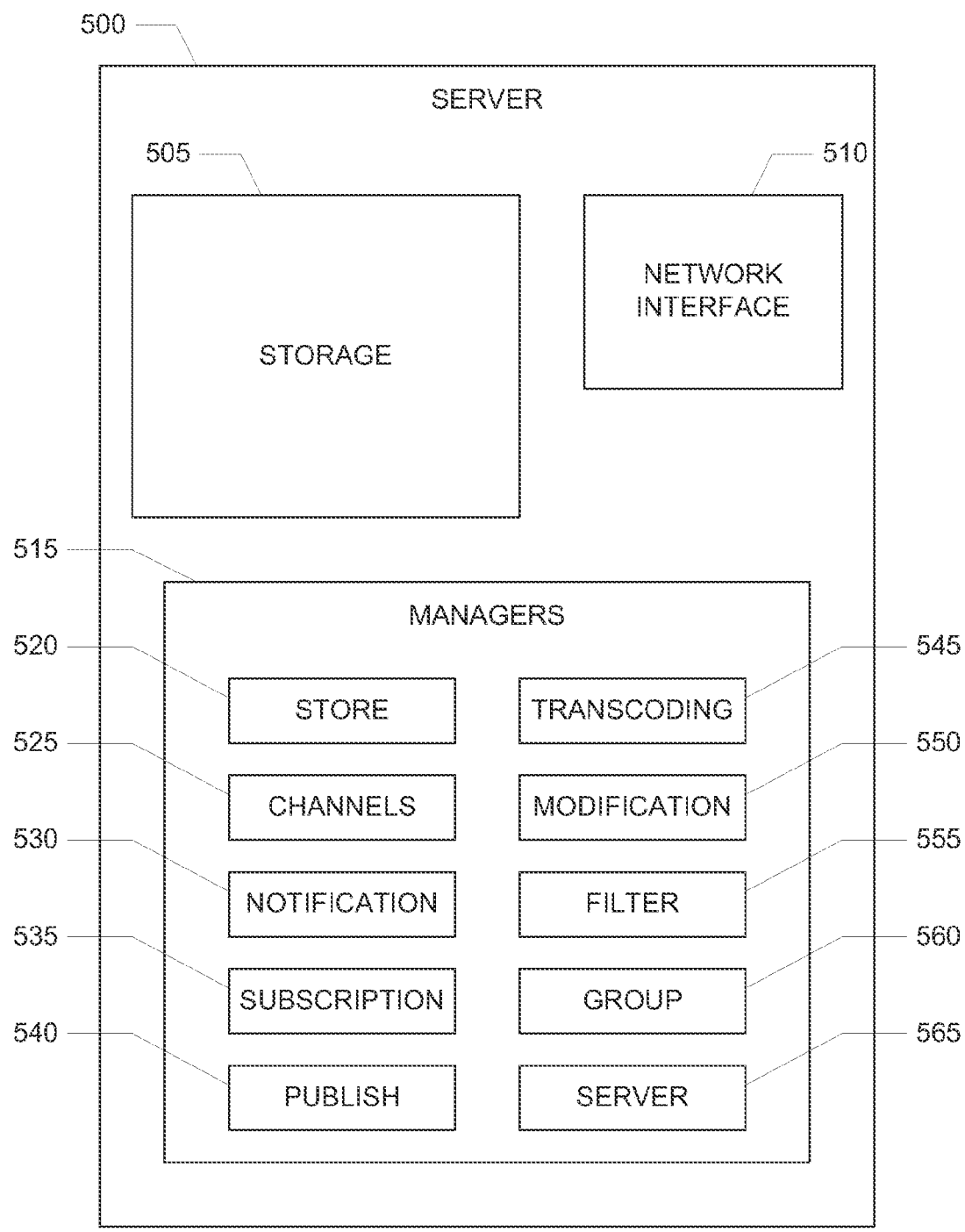
FIG. 5 shows a block diagram of one implementation of a server.

FIG. 3 shows a block diagram of one implementation of a publishing client 300. FIG. 4 shows a block diagram of one implementation of a subscribing client 400. FIG. 5 shows a block diagram of one implementation of a server 500. Combination devices, such as the publishing/subscribing client 225 shown in FIG. 2, combine elements of the systems shown in FIGS. 3-5. The operation and interaction of the publishing client, subscribing client, and server are described below referring to the flowcharts shown in FIGS. 6-11. Similarly, operation of combination devices includes aspects of the flowcharts shown in FIGS. 6-11.

In FIG. 3, the publishing client 300 includes a media capture component 305, a display 310, a user interface 315, a control component 320, storage 325, and a network interface 330. These components are interconnected, and though the interconnections are omitted from FIG. 3, the interconnections should be readily appreciated by one of ordinary skill in the art.

The media capture component 305 includes one or more input devices for capturing media data, such as for capturing audio, video, or still imagery. Examples of input devices include, but are not limited to, a digital camera and a microphone.

The display 310 is a visual display for presenting the captured media data to a user, such as an LCD screen. The display 310 also provides visual feedback to a user of the operation of the publishing client 300.

The user interface 315 includes one or more user input and output devices for a user to interact with and input commands into the publishing client 300. Examples of user input devices include, but are not limited to, a keypad, a button, a switch, a joystick, a touchscreen, and a microphone. Examples of user output devices include, but are not limited to, an LED and a speaker. In addition, one or more user input devices can also be used as a media capture device, such as a microphone, or as a display, such as a touchscreen.

The control component 320 is for controlling the operation of the publishing client 300, including each of the components within the publishing client 300. In one implementation, the control component 320 includes a microprocessor and some or all of the control functionality is provided by software executed by the microprocessor. The control component 320 also includes several specialized control components: a capture component 335, a store component 340, a publish component 345, an edit component 350, an annotate component 355, and a metadata component 360. In one implementation, one or more of the specialized components can be combined into a single component. In another implementation, the specialized control components of the control component 320 are implemented as a single software package.

The capture component 335 controls capturing media data using the media capture component 305. The store component 340 controls storing data and managing stored data in the storage 325. As described below, media data is stored in media files. The publish component 345 controls publishing media data to a server through the network interface 330. The publish component 345 maintains information indicating the currently selected publishing channel. The publishing channel is the network media channel to which a media file is to be published. The user can change the selected publishing channel through the display 310 and user interface 315. The edit component 350 controls editing captured media data using the display 310 and user interface 315. Editing media data includes changing the media data or adding non-destructive changes to the media data. Examples of media data editing include, but are not limited to, cropping, re-sizing, applying or changing colors, applying visual or audio filters, adjusting volume or tone, and changing the storage format of the media data (e.g., from JPEG to GIF). The annotate component 355 controls adding annotations to media data using the display 310 and the user interface 315. Examples of annotations include, but are not limited to, text comments, titles, audio comments, and visual marks added to an image. The metadata component 360 controls generating metadata and adding metadata to media data. Metadata can include many types of data, such as to assist in processing and organizing the media data. Examples of metadata include, but are limited to, timestamps (e.g., from a clock of the publishing client), keywords, author information, authorization information (e.g., an access code or password), subject information, location information (e.g., GPS information), and network media channel information (e.g., indicating the publishing channel). The metadata component 360 generates metadata using status components and data and can also receive metadata from a user, another component of the publishing client 300, or an external device. In one implementation, the publishing client maintains a user profile to provide metadata for media files created by the user. The metadata component 360 adds the metadata to the media file storing the media data. In one implementation, the metadata for a media file to be published includes at a minimum a timestamp and network media channel indicator to identify to which channel the media file is to be published.

The storage 325 is a memory device for storing media data in media files. Examples of storage include, but are not limited to, embedded nonvolatile memory such as a hard or optical disk or flash memory, and removable memory such as a PCMCIA memory card.

The network interface 330 provides the connection between the publishing client 300 and the network or another device for publishing media files. In one implementation, the network interface 330 is an air interface for establishing and providing a wireless connection (e.g., to a base station), such as a CDMA interface. In another implementation, the network interface 330 provides a wired connection to a local network.

In FIG. 4, the subscribing client 400 includes a display 405, a user interface 410, a control component 415, storage 420, and a network interface 425. As in FIG. 3, these components are interconnected, and though the interconnections are omitted from FIG. 4, the interconnections should be readily appreciated by one of ordinary skill in the art. In addition, the display 405, user interface, 410, storage 420, and network interface 425 in the subscribing client 400 are substantially similar to those in the publishing client 300, as described above.

The control component 415 is for controlling the operation of the subscribing client 400, including each of the components within the subscribing client 400. In one implementation, the control component 415 includes a microprocessor and some or all of the control functionality is provided by software executed by the microprocessor. The control component 415 also includes several specialized control components: a subscribe component 430, a notify component 435, a download component 440, a store component 445, a present component 450, an edit component 455, an annotate component 460, a metadata component 465, and a filter component 470. In one implementation, one or more of the specialized components can be combined into a single component. In another implementation, the specialized control components of the control component 415 are implemented as a single software package.

The subscribe component 430 controls subscribing to network media channels by the subscribing client 400. The subscribe component 430 creates requests to subscribe to send to the appropriate server and also manages to which channels the subscribing client 400 is subscribed. In one implementation, the subscribe component 430 also manages authorizations for the subscribing client to subscribe to restricted network media channels (e.g., channels that require a password to subscribe). The notify component 435 controls requesting and receiving notifications of updates to channels to which the user has subscribed. As described below, in one implementation, the subscribing client 400 accesses a notification page from the server to determine what updates, if any, are available for a channel. The download component 440 controls requesting and receiving media files from a server. The download component 440 requests media files according to notifications received for a subscribed network media channel. The store component 445 controls storing data and managing stored data in the storage 420. The present component 450 controls presenting downloaded media data to a user through the display 405 and user interface 410. The present component 450 can cause the display and user interface to present one or more media files from each of two or more network media channels. For example, in one implementation, the present component 450 displays the media files for two network media channels as two horizontal bars of images, in time order, one bar above the other. The edit component 455, the annotate component 460 and the metadata component 465 operate similarly to the corresponding components in the publishing component 300, as described above. The edit component 455 controls editing downloaded media data using the display 405 and user interface 410. The annotate component 460 controls adding annotations to media data using the display 405 and the user interface 410. The metadata component 360 controls generating metadata and adding metadata to media data.

The filter component 470 controls creating a filter channel at a server. As described below, a filter channel is a collection of media files from one or more target network media channels selected according to a filter query having one or more filter terms or criteria. Using input from the user, the filter component 470 builds the filter profile indicating the filter target channels and the filter query and provides the filter profile to the server. The server builds the filter channel as a new network media channel, where all the media data is extracted from other channels. As a result, other users can subscribe to the new filter channel, treating it as a normal channel. In another implementation, a publishing client also has a filter component to create filter channels.

In FIG. 5, the server 500 storage 505, a network interface 510, and a collection of managers 515. As in FIGS. 3 and 4, these components are interconnected, and though the interconnections are omitted from FIG. 5, the interconnections should be readily appreciated by one of ordinary skill in the art.

The storage 505 and network interface 510 in the server 500 are substantially similar to those in the publishing client 300 and subscribing client 400, as described above. The storage 505 stores media data in media files for the network media channels. In one implementation, the storage 505 uses a hierarchical storage system based on the network media channels. In another implementation, the storage 505 is distributed across multiple devices or systems, or distributed among storage systems connected by the network. The network interface 510 provides a connection between the server and the publishing clients and subscribing clients.

The managers 515 are for controlling the operation of the server 500, including each of the components within the server 500. In one implementation, the server 500 includes one or more microprocessors and some or all of the control and manager functionality is provided by software executed by the microprocessor. In one such implementation, each of the managers executes as a respective process. The managers 415 include several specialized managers: a store manager 520, a channels manager 525, a notification manager 530, a subscription manager 535, a publish manager 540, a transcoding manager 545, a modification manager 550, a filter manager 555, a group manager 560, and a server manager 565.

The store manager 520 controls storing media data in the storage 505. The store manager 520 ensures that the received published media files are properly categorized and associated with the correct network media channels. The channels manager 525 controls the creation, deletion, and management of network media channels.

The channels manager 525 processes requests to add or remove network media channels, and creates and updates information for channels appropriately. For example, in one implementation, the channels manager 525 determines from what client the request to create the new channel came and restricts publishing media files to the new channel to that same client (in conjunction with the publish manager, described below). In one implementation, one or more network media channels are created as restricted channels, and only authorized subscribing clients are permitted to subscribe to a restricted channel. The channels manager 525 maintains information about whether a channel is restricted or not, and if so, what authorization is required to subscribe (e.g., a password or membership in a group or list).

The notification manager 530 manages changes to the media files for each network media channel. The notification manager 530 builds a notification page for each channel indicating the state of changes to media files for that channel, such as the addition of new media files. In another implementation, the notification manager 530 sends direct notifications to subscribing clients indicating that an update to the channel is available.

The subscription manager 535 manages information indicating which users (or what devices) are subscribed to each network media channel provided by the server 500. In one implementation using restricted channels, the subscription manager 535 verifies that a subscribing client is authorized to subscribe to a restricted channel before allowing the subscribing client to become a subscriber for that channel. In one implementation, The subscription manager 535 extracts authorization information from a subscription request received from the subscribing client to authorize the subscription. The publish manager 540 manages media files received as published files.

The publish manager 540 determines the publishing channel for a media file to be published and arranges for proper storage of the media file. In one implementation, the publish manager 540 retrieves the publishing channel from the metadata of a media file. In one implementation, the publish manager 540 also checks that the media file is authorized to be published to the indicated publishing channel. The publish manager 540 retrieves identifying information or authorizing information from the metadata of the media file. In one implementation, only the publishing client that creates the network media channel can publish to the channel. In another implementation, only members of a defined group can publish to the channel.

The transcoding manager 545 manages providing a published media file in a requested format. One type of metadata associated with a subscriber or a request for a media file indicates in what format the media file it to be delivered. When a subscriber requests a media files in a format different from that in which the media file is stored in the storage 505, the transcoding manager 545 causes a new media file to be created and stores a transcoded version (e.g., transcoded from JPEG to GIF) of the original media file in the new media file.

The modification manager 550 manages changes or additions made to media files by subscribing clients. When a client adds an annotation or edits a media file and requests that the change or addition be published in the network media channel, the modification manager 550 incorporates the new or modified media file into the channel. In one implementation, the owner or originator of a channel may prohibit changes or additions to a channel being published to the channel (though changes made to the media files and kept only at the subscribing client might be acceptable).

The filter manager 555 manages any filter channels that have been established by subscribing clients. As discussed above, filter channel is a collection of media files from one or more target network media channels selected according to a filter query having one or more filter terms or criteria. The filter manager 555 stores the filter profile for the filter channel and extracts media files according to the filter profile. The filter manager 555 allows subscribing clients to subscribe to the filter channel as well.

The group manager 560 manages group channels. A group channel is collection of media files published by different publishing clients. In one implementation, the group channel is similar to a filter and extracts media files from other network media channels. In another implementation, the group channel is similar to a regular network media channel and media files can be published to the group channel directly. A group channel can also be defined or limited by criteria such as time, members, and location.

The server manager 565 manages the operation of the server 500 outside the operations of the other managers.

FIG. 6 shows a flowchart 600 of one implementation of providing a network media channel using a publishing client and a server interconnected by a network, such as the publishing client 210 and server 215 interconnected by the network 205 shown in FIG. 2.

The publishing client captures media data, block 605. As described above, the publishing client includes a media capture device or component for capturing audio, video, text, drawing, or some other form of media data. For example, in one implementation, the publishing client includes a camera and a microphone for capturing audio and still or motion video. In another implementation, a separate device captures the media data and provides the captured media data to the publishing client.

The publishing client stores the captured media data in a media file, block 610. As described above, the publishing client includes storage, such as embedded or removable flash memory. The publishing client creates media files for captured media data and stores the media data in the new file.

The publishing client modifies the media file, block 615. The publishing client adds metadata to the media file indicating the author, the time the media data was captured, and the publishing channel (i.e., the network media channel to which the media file is to be published) The publishing client can query the user for additional information as appropriate, such as to select a channel for publishing. Other implementations provide more or less metadata, and can also allow a user to select what metadata to include. Examples of metadata include, but are not limited to, time information, publishing channel information (e.g., to what network media channel the media file is to be published), keywords, author information, user information (e.g., personal characteristics of the user such as height, blood type, age, or mood), title, capturing device, publishing device, location, event information, a hierarchical class (e.g., indicating to which category among a group of externally defined categories the media file belongs), links to other media files or network resources (e.g., a URL), a link to another network media channel, and associated channel information (e.g., indicating with which other channels the media file is associated, or with which other channels the publishing channel is associated). In one implementation, information describing the layout and presentation of a media file in the channel can also be added as metadata.

As described above, in one implementation, the publishing client also provides editing functionality for a user to modify, supplement, or annotate the media data in the media file. The user can make various changes to the data, such as resizing or cropping an image or changing the format of the media file. The publishing client can treat the changes as destructive or non-destructive (e.g., retractable) to the media data. The user can add additional data to a media file or annotate a media file, such as by adding an audio or text comment or an overlaying image, or by adding information about the media file, such as a title. If the publishing client does not modify the media file, block 615 is skipped.

The publishing client publishes the media file, block 620. After completing any modifications, the user requests that the publishing client publish the media file. If the publishing channel has not already been set, the publishing client sets the publishing channel in metadata for the media file. In one implementation, the publishing client confirms the publishing channel with the user. In another implementation, the publishing client indicates multiple publishing channels to publish the media file. The publishing client sends the media file to a server through the network to be published to the indicated network media channel. In another implementation, the publishing client sends a link to the server, the link indicating a storage location for the media file.

FIG. 7 shows a flowchart 700 of one implementation of providing a network media channel using a subscribing client and a server interconnected by a network, such as the subscribing client 220 and server 215 interconnected by the network 205 shown in FIG. 2.

A subscribing client subscribes to a network media channel through a server, block 705. The subscribing client receives a notification of or information about a network media channel to which the subscribing client can subscribe, such as received in an email or retrieved from an online index or directory of network media channels. The subscribing client sends a subscription request to the server through the network. The subscription request includes information identifying the subscribing client and indicating the network media channel. In one implementation, the subscription request also includes authorization information indicating that the subscribing client has the authority or permission to subscribe to the indicated network media channel. The server returns confirmation that the subscribing client is a subscriber to the subscribed channel.

The subscribing client receives a notification that an update has occurred for the subscribed channel, block 710. A notification of an update indicates that new media is available for the subscribed channel. The notification can also provide information about the new media, such as a title, a time, or information indicating whether the new media file is a completely new file or a modification or annotation to a previously published file. In one implementation, the server maintains a notification table or page (e.g., an RSS page (Rich Site Summary)) for the subscribed channel. When the server has received an update, the server changes the notification page to reflect the update. In one implementation, the server uses a notification flag to indicate whether an update has occurred during a defined time period. The subscribing client requests the notification page from the server to determine whether updates have occurred. For example, one subscribing client is set to check with the server for each subscribed channel two times each day. In another implementation, the subscribing client receives a direct notification from the server of an update. The server sends out a notification to each of the recorded subscribers for a network media channel when there is an update for the channel, such as by email. The email can specifically indicate what updates have occurred or merely that an update has occurred. Alternatively, the server provides a notification on a regular basis (e.g., once each hour or day), rather than for every update.

The subscribing client receives a media file according to the notification, block 715. The subscribing client requests the updated or new media file(s) from the server and the server sends the media file(s) to the subscribing client. In one implementation, the subscribing client downloads media files from the server as a background process while performing other tasks. In another implementation, the subscribing client requests that the media file be sent to another storage location or device as well as or instead of the subscribing client. In another implementation, the server automatically sends new media files to a subscribing client (e.g., in a push model), such as along with the notification or after receiving confirmation that the notification was received.

The subscribing client stores the received media file according to the subscribed channel, block 720. The subscribing client stores media files for the subscribed channel according to guidelines set by the user for the subscribed channel. For example, the user can set an expiration period indicating how long a media file is to be retained.

The subscribing client presents the media data of the media file to a user, block 725. The subscribing client presents the media data of the new media file along with media data from other older media files in the subscribed channel (e.g., media files previously downloaded and stored). In one implementation, the media data for each file is presented as an item in a horizontal row of images or items in time order, with the most recently published item at the left. The user selects one of the items to activate or play the media data for the item (e.g., to view and hear a video clip). In one implementation, the subscribing client presents media data from two or more network media channels at the same time, such as using respective horizontal rows of images. In one implementation, the subscribing client presents one media file at a time, in order of ascending time. In another implementation, the user can change the presentation of media data. The user can set the layout and ordering of items from the subscribed channel. For example, rather than a horizontal row of items in time order, the user can select to have the media items arranged by title in a three-dimensional pyramid formation. In another example, the subscribing client supports a search function for finding media files, such as by keyword or author. In one implementation, information describing the layout and presentation is added as metadata to a media file when modifying a file.

The subscribing client modifies the new media file, block 730. The subscribing client provides editing and annotating functionality similar to that of the publishing client described above. The subscribing client allows a user to edit the media data, add media data or annotations, and modify or add metadata for the media file. The subscribing client sends the modifications back to the server, block 735. The uploaded changes are published so that all the subscribing clients for that channel will have access to the changes. In one implementation, the subscribed channel does not permit modifications to be published back to the channel by a subscribing client, or only by certain subscribing clients. In another implementation, the subscribing channel permits only some types of modification, such as allowing annotations, but not allowing the media data to be edited. If the subscribing client does not have the authority or permission to make the requested changes, the subscribing client stores the changes locally so that when the media file is presented on the subscribing client the changes are available, but the changes will not be published so that other subscribing clients will not have access to the changes. Alternatively, the changes are discarded.

In another implementation, modifications by a subscribing client are submitted as proposed modifications and other subscribing clients can participate in accepting, declining, or editing the proposed modifications. For example, different subscribing clients could have different priority or ranking in deciding what modifications to accept. In this way, multiple subscribing clients can collaboratively edit and create a network media channel and its media files.

If the subscribing client does not have any modification to make to the media file, blocks 730 and 735 are skipped. Similarly, in an implementation where subscribing clients are not permitted to modify media files in network media channels, blocks 730 and 735 are skipped.

FIG. 8 shows a flowchart 800 of one implementation of providing a network media channel using a server, a publishing client, and a subscribing client interconnected by a network, such as the server 215, publishing client 210, and subscribing client 220 interconnected by the network 205 shown in FIG. 2.

A server creates a network media channel, block 805. The server creates the network media channel in response to a request received from a publishing client or a subscribing client. The request indicates characteristics of the network media channel, such as restrictions on publishing or subscribing. For example, one network media channel is restricted in that only the creating client can publish media files to the channel, only subscribing clients from a particular list can subscribe without a password, only one subscribing client and the publishing client can publish modifications to the media files of the channel, and only video files of a certain resolution can be published to the channel. In one implementation, the request can also indicate layout and presentation information indicating how a subscribing client is to present the media data of the network media channel. The server also prepares a new notification page or table for the new channel.

The server adds a subscribing client as a subscriber to the network media channel, block 810. The server receives a request to be added as a subscriber from the subscribing client (or a request from another client to add the subscribing client). If the channel is restricted, the server first verifies that the subscribing client is authorized to become a subscriber. The server adds the subscribing client to a list of subscribers for the network media channel.

The server receives a media file to be published from a publishing client, block 815. The server determines to which network media channel the received media file is to be published. If the network media channel is restricted, the server verifies that the publishing client is authorized to publish to the channel and verifies that the media file is within any other restrictions of the channel.

The server stores the media file according to the network media channel, block 820. The server updates indexes related to relevant metadata of the new media file.

The server publishes the media file, block 825. Once the media file is published, subscribing clients that are subscribers can request the media file from the server.

The server generates a notification indicating the new media file is available, block 830. The notification indicates a new file is available for the network media channel. The notification can also indicate additional information, such as the type of file, author, time of publication, or information indicating whether the new media file is a completely new file or a modification or annotation to a previously published file. In one implementation, the server maintains a notification page or table including the notification information (e.g., an RSS page). When the server has received an update, the server changes the notification page to reflect the update. In one implementation, the server uses a notification flag to indicate whether an update has occurred during a defined time period. Subscribing clients that are subscribers can request and access the notification page to determine whether an update has occurred. In another implementation, the server sends a notification to each of the subscribing clients that are recorded subscribers for a network media channel when there is an update for the channel, such as by email. Alternatively, the server provides a notification on a regular basis (e.g., once each hour or day), rather than for every update.

The server sends the media file to a subscribing client, block 835. The server receives a request from a subscribing client that is a subscriber to the network media channel. In another implementation, the server automatically sends new media files to a subscribing client (e.g., in a push model), such as along with the notification or after receiving confirmation that the notification was received. In one implementation, the server provides transcoding to match the subscribing client. The server determines the type of platform of the subscribing client and the format that the subscribing client is requesting. In one implementation, the subscribing client provides the platform information in the initial subscription request and provides the format information in the request for the media file. If the stored media file does not match the platform and format for the subscribing client, the server transcodes the media file to match the client. In another implementation, the server stores the media files in multiple formats for multiple platforms, or caches the results of transcoding. In another implementation, the server streams media data to the subscribing client rather than sending the media file as a whole. In yet another implementation, the server provides to the subscribing client a link to the media file to be accessed later.

The server receives a modified media file from the subscribing client, block 840. As described above, the subscribing client provides editing and annotating functionality similar to that of the publishing client. The subscribing client allows a user to edit the media data, add media data or annotations, and modify or add metadata for the media file. The server receives the modified file from the subscribing client. If the channel is a restricted channel, the server verifies that the subscribing client sending the modified media file has the authority to publish modifications to the media file to the network media file, or has the authority to publish modification of the kind made to the media file.

If the modification is acceptable, the server stores the modified media file, block 845. The server updates indexes related to relevant metadata of the new media file.

The server publishes the modified media file, block 850. Once the media file is published, subscribing clients that are subscribers can request the media file from the server. The server treats the modified media file as an update and generates another notification for subscribers. Alternatively, modified media files are not treated as updates and so the server does not generate notifications for these media files, only for newly published media files.

If the server does not receive a modified media file from a subscribing client, blocks 840, 845, and 850 are skipped. Similarly, in an implementation where subscribing clients are not permitted to modify media files in network media channels, blocks 840, 845, and 850 are skipped.

FIG. 9 shows a flowchart 900 of one implementation of providing a network media channel using a publishing client, a server, and a subscribing client interconnected by a network, such as the publishing client 210, server 215, and subscribing client 220 interconnected by the network 205 shown in FIG. 2. FIG. 9 follows the path of one media file as the file is created, published, and downloaded, and so FIG. 9 combines aspects of the processes described above referring to FIGS. 6-8 for a publishing client, a subscribing client, and a server.

A publishing client creates a new network media channel by sending a new channel request to a server, block 905. The server creates the new network media channel upon verifying the request from the publishing client. A subscribing client subscribes to the new channel by sending a subscription request to the server, block 910. The server verifies the subscription request and adds the subscription client to the list of subscribers for the channel. The publishing client captures media data using an embedded media capture device into a new media file, block 915. The publishing client edits the media data in the new media file, block 920, and adds metadata to the media file, block 925. The added metadata includes a timestamp and an indication that the new channel is the publishing channel for the media file. The publishing client publishes the media file by sending the media file to the server, block 930. The server verifies the media file and publishes the file to the new channel, making the media file available to subscribers of the channel. The server updates the notification page for the new channel indicating the new media file has been received, block 935. The subscribing client accesses the notification page and requests the new media file, block 940. The server sends the new media file to the subscribing client as a subscriber to the new channel, block 9450. The subscribing client receives the new media file and presents the media data in the file to a user of the subscribing client, block 950. The subscribing client can also present other media files from the new channel or from other network media channels. The subscribing client modifies the media file, block 955. The subscribing client can edit the media data, add media data, and add annotations to the media file. The subscribing client uploads the modified media file to the server, block 960. After verifying the modifications are acceptable, the server publishes the modified media file back to the new channel, block 965.

FIG. 10 shows a flowchart 1000 of one implementation of providing a filter channel using a server and a subscribing client interconnected by a network, such as the server 215 and subscribing client 220 interconnected by the network 205 shown in FIG. 2. As discussed above, a filter channel is a special type of network media channel that is a composite of media files extracted from one or more other network media channels. The filter channel extracts media files from these target network media channels according to a filter query including one or more filter terms. Accordingly, in one aspect, a filter channel is similar to a persistent search applied repeatedly to the target channels. Examples of filter terms include, but are not limited to, data stored in the metadata of media files such as keywords or time, and attributes of the media files such as type, format, or size. If the filter query does not have any filter terms, the filter channel extracts all of the media files from the target channels, forming a composite channel or a type of group channel. In another implementation, the target channels are also defined by a filter query.

The filter channel is updated as the target channels of the filter channel are updated. Once established, the filter channel is treated similarly to a regular network media channel and subscribing clients can subscribe to the filter channel. However, publishing clients do not publish media files to the filter channel directly. New media files are added to the filter channel by being added to one of the target channels and then extracted to the filter channel. In an alternative implementation, publishing clients can publish directly to a filter channel as well. In one implementation, modifications or annotations made by subscribing clients to media files in the filter channel can be presented in both the target channels and the filter channel, in only one of the two, or modifications may not be permitted by a subscribing client as a subscriber to the filter channel (though the same modification may be permitted by a subscribing client as a subscriber to the target channel).

A subscribing client builds a filter profile for a new filter channel, block 1005. A filter profile indicates one or more target network media channels and a filter query including zero or more filter terms. The target network media channels are network media channels accessible to the subscribing client (e.g., channels to which the subscribing client has authorization to subscribe).

The subscribing client sends a filter request to the server, block 1010. The filter request includes the filter profile. The filter request also includes any restrictions the subscribing client wants imposed on the new filter channel, similar to creating a normal network media channel.

The server creates the filter channel and extracts from each of the target channels any media files that match the filter query of the filter channel, block 1015. Before building the new filter channel, the server verifies the filter request is proper (e.g., for syntax and authorization). The server searches among the media files of each target channel for media files that match the filter query, and extracts any media files that match the filter query. The server makes copies of or references to the extracted files, and so the extraction does not affect the target channels and the extracted media files themselves. The server treats the extracted media files similarly to media files to be published to a normal network media channel.

The server opens access to the filter channel and publishes the media files of the filter channel, block 1020. The server accepts subscription requests for the filter channel and provides notifications for updates to the filter channel (where updates to the filter channel include media files published to target channels and that match the filter query). Periodically, the server updates the media files included in the filter channel. Alternatively, the server updates the filter channel whenever one of the target channels of the filter channel is updated.

In an alternative implementation, a filter channel, or another type of filter channel, is managed by the subscribing client rather than the server. In this case, the subscribing client does not submit the filter profile to the server. The subscribing client applies the filter profile to the network media channels already being supplied to the subscribing client as a subscriber. The subscribing client then designates some or all of the received channels as target channels and applies a filter query to the target channels. In one implementation, the subscribing client then re-publishes the media items in the filter channel to a server as a normal channel.

FIG. 11 shows a flowchart 1100 of one implementation of providing a group channel using a publishing client, a server, and a subscribing client interconnected by a network, such as the publishing client 210, server 215, and subscribing client 220 interconnected by the network 205 shown in FIG. 2. As discussed above, a group channel is a special type of network media channel that is published to by multiple publishing clients that are members of a group. Subscribing clients outside the group may be permitted to subscribe to the group channel, but are not permitted to publish to the group.

A publishing client builds a group profile, block 1105. The group profile defines the members of the group. The members can be defined in various ways, such as by device, by user, by location, by password, or some combination of criteria.

The publishing client sends a group request to a server, block 1110. The group request includes the group profile.

The group request also includes any additional restrictions the subscribing client wants imposed on the new group channel, similar to creating a normal network media channel.

The server creates the group channel and publishes media files from publishing clients that are members of the group, block 1115. Before building the new group channel, the server verifies the group request is proper (e.g., for syntax and authorization). The server receives media files to be published from publishing clients and verifies the publishing clients are group members. For authorized publishing clients, the server publishes the media files to the group channel and provides notifications as new media files are added.

In an alternative implementation, the group channel is a type of filter channel and the group profile includes a filter profile. The group profile defines a group including several publishing clients by selecting the network media channels of those group members as the target channels for the filter profile.

The various implementations of the invention are realized in electronic hardware, computer software, or combinations of these technologies. Some implementations include one or more computer programs executed by a programmable processor or computer. For example, referring to FIGS. 3-5, in one implementation, the publishing client, the subscribing client, and the server each include one or more programmable processors. In general, each computer includes one or more processors, one or more data storage components (e.g., volatile or nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using a network media channel for a user using a publishing device, in other implementations, the focus of the channel can be different, such as upon a particular device, a location, an event, or a time period.

Accordingly, the present invention is not limited to only those implementations described above.

What is claimed:

1. A method comprising:
   receiving, from a subscribing client, a plurality of requests to subscribe to a plurality of network media channels, wherein the plurality of network media channels comprise media files published from respective publishing clients;
   providing, to the subscribing client, access to the plurality of network media channels to allow display of media data from the plurality of network media channels;
   receiving a series of media files from the publishing clients and corresponding metadata for each media file of the series of media files for updating the media data to be published to the plurality of network media channels;
   evaluating the metadata for each media file of the series of media files to determine the network media channels to which the media files are to be published;
   displaying, to the subscribing client, the series of media files from the plurality of network media channels to which the subscribing client is subscribed as a time-based progression of the media files, wherein the series of media files are displayed as bars of images indicating an order of time of publication of each of the media files;
   receiving, from another subscribing client, an annotation associated with a media file of the series of media files, wherein the annotation is one or more of a text comment, a title, an audio comment, and a visual mark annotating an image;
   adding the annotation to the media file;
   publishing, to the subscribing client, the media file such that the added annotation is displayed to the subscribing client; and
   updating a notification page associated with the subscribing client with an indication of an update to the media data for at least one of the plurality of network media channels, an indication of a time when the media data was updated, and an indication of the annotation associated with the media file by the other subscribing client.

2. The method of claim 1, wherein the metadata for updating the media data on the network media channel comprises at least one of author information, GPS information, a timestamp, or an annotation associated with the media data.

3. The method of claim 1, wherein the annotation associated with the media file comprises a text or audio comment.

4. The method of claim 1, wherein providing, to the subscribing client, access to the plurality of network media channels to allow display of media data from the plurality of network media channels comprises sending the media data to the subscribing client.

5. The method of claim 4, wherein access to the plurality of subscribed network media channels is provided via a filter channel that comprises a collection of media files that include the media files from the network media channel and media files from other channels of the plurality of subscribed network media channels, wherein the collection of media files meet one or more filter terms or criteria, and wherein media data associated with the collection of media files is displayed via a network media channel page.

6. The method of claim 1, further comprising:
   receiving, from the subscribing client, a keyword associated with a search function; and
   finding one or more media files of the series of media files that are associated with the keyword.

7. The method of claim 1, further comprising:
   receiving, from the subscribing client, an indication that identifies an author; and
   finding one or more media files of the series of media files that are associated with the author.

8. The method of claim 1, further comprising capturing the media data at the publishing client, and wherein the media data comprises video data.

9. The method of claim 1, wherein media files from two or more network media channels are presented to the subscribing client at the same time.

10. The method of claim 1, wherein the annotation is a visual mark annotating an image, provided that the visual mark does not edit the image.

11. A device comprising:
a processor configured to:
receive, from a subscribing client, a plurality of requests to subscribe to a plurality of network media channels, wherein the plurality of network media channels comprise media files published from respective publishing clients;
provide, to the subscribing client, access to the plurality of network media channels to allow display of media data from the plurality of network media channels;
receive a series of media files from the publishing clients and corresponding metadata for each media file of the series of media files for updating the media data to be published to the plurality of network media channels;
evaluate the metadata for each media file of the series of media files to determine the network media channels to which the media files are to be published;
display, to the subscribing client, the series of media files from the plurality of network media channels to which the subscribing client is subscribed as a time-based progression of the media files, wherein the series of media files are displayed as bars of images indicating an order of time of publication of each of the media files;
receive, from another subscribing client, an annotation associated with a media file of the series of media files, wherein the annotation is one or more of a text comment, a title, an audio comment, and a visual mark annotating an image;
add the annotation to the media file;
publish, to the subscribing client, the media file such that the added annotation is displayed to the subscribing client; and
update a notification page associated with the subscribing client with an indication of an update to the media data for at least one of the plurality of network media channels, an indication of a time when the media data was updated, and an indication of the annotation associated with the media file by the other subscribing client.

12. The device of claim 11, wherein the metadata for updating the media data on the network media channel comprises at least one of author information, GPS information, a timestamp, or an annotation associated with the media data.

13. The device of claim 11, wherein the annotation associated with the media file comprises a text or audio comment.

14. The device of claim 11, wherein the processor being configured to provide, to the subscribing client, access to the plurality of network media channels to allow display of media data from the plurality of network media channels further comprises the processor being configured to send the media data to the subscribing client.

15. The device of claim 11, wherein the processor is further configured to:
receive, from the subscribing client, a keyword associated with a search function; and
find one or more media files of the series of media files that are associated with the keyword.

16. The device of claim 11, wherein the processor is further configured to:
receive, from the subscribing client, an indication that identifies an author; and
find one or more media files of the series of media files that are associated with the indication that identifies the author.

17. The device of claim 11, wherein the processor is configured to provide access to the plurality of subscribed network media channels via a filter channel that comprises a collection of media files that include the media files from the network media channel and media files from other channels of the plurality of subscribed network media channels, wherein the collection of media files meet one or more filter terms or criteria.

18. The device of claim 11, wherein the annotation is a visual mark annotating an image, provided that the visual mark does not edit the image.

19. A method comprising:
sending, from a subscribing client, a plurality of requests to subscribe to a plurality of network media channels, wherein the plurality of network media channels comprise media files published from respective publishing clients;
displaying, via the subscribing client, a series of media files from the plurality of network media channels to which the subscribing client is subscribed as a time-based progression of the media files, wherein the series of media files are displayed as bars of images indicating an order of time of publication of each of the media files;
displaying, via the subscribing client, an annotation associated with a media file of the series of media files, wherein the annotation is associated with another subscribing client, and wherein the annotation is one or more of a text comment, a title, an audio comment, and a visual mark annotating an image;
receiving, via a notification page associated with the subscribing client, an indication of an update to at least one of the media files for at least one of the plurality of network media channels, an indication of a time when the at least one of the media files were updated, and an indication of the annotation associated with the media file by the other subscribing client; and
receiving metadata for updating the at least one of the media files on the plurality of network media channels, wherein the metadata indicates the update the network media channels for being updated.

20. The method of claim 19, further comprising:
receiving a selection of one of the bars of images associated with a media file of the series of media files; and
playing the media file in response to the selection of the one of the bars of images.

21. The method of claim 19, wherein the annotation is a visual mark annotating an image, provided that the visual mark does not edit the image.

22. A device comprising:
a display; and
a processor configured to:
send a plurality of requests to subscribe to a plurality of network media channels, wherein the plurality of network media channels comprise media files published from respective publishing clients;
display, via the display, a series of media files from the plurality of network media channels to which the device is subscribed as a time-based progression of the media files, wherein the series of media files are displayed as bars of images indicating an order of time of publication of each of the media files;

display, via the display, an annotation associated with a media file of the series of media files, wherein the annotation is associated with another subscribing client, and wherein the annotation is one or more of a text comment, a title, an audio comment, and a visual mark annotating an image;

receive, via a notification page associated with the device, an indication of an update to at least one of the media files for at least one of the plurality of network media channels, an indication of a time when the at least one of the media files was updated, and an indication of the annotation associated with the media file by the other subscribing client; and receive metadata for updating the at least one media file on the plurality of network media channels, wherein the metadata indicates the update and the network media channels for being updated.

23. The device of claim 22, wherein the metadata for updating the at least one media file on the plurality of network media channels comprises at least one of author information, GPS information, or a timestamp.

24. The device of claim 22, wherein the processor is configured to display the series of media files from the plurality of network media channels via a filter channel that comprises a collection of media files that include the series of media files from the plurality of network media channels.

25. The device of claim 22, wherein the processor is configured to display two or more media files at the same time.

26. The device of claim 22, wherein the processor is further configured to:
   receive a selection of one of the bars of images associated with a media file of the series of media files; and
   play the media file in response to the selection of the one of the bars of images.

27. The device of claim 22, wherein the annotation is a visual mark annotating an image, provided that the visual mark does not edit the image.

* * * * *